Dec. 17, 1929.  E. W. GARD ET AL  1,739,898
PROCESS OF TREATING OIL
Filed Nov. 16, 1926
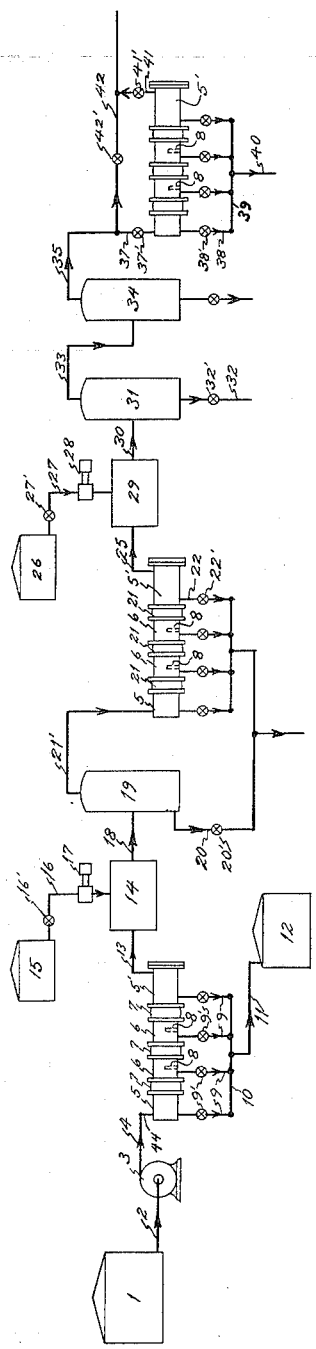
INVENTOR
Earl W. Gard.
BY
ATTORNEY Patented Dec. 17, 1929

1,739,898

UNITED STATES PATENT OFFICE

EARLE W. GARD, OF LONG BEACH, AND BLAIR G. ALDRIDGE, OF LOS ANGELES COUNTY, AND HUGH J. MULTER, OF HUNTINGTON PARK, CALIFORNIA

PROCESS OF TREATING OIL

Application filed November 16, 1926. Serial No. 148,730.

Oils, such as lubricating oils and gasoline, are usually refined by treating them with acid and neutralizing the acid treated oil with an alkali, or with a decolorizing and neutralizing medium such as a clay.

We have found that the presence of water in the oil materially affects the efficiency of the process. Oils when treated with acid, such as fuming sulphuric acid, are partially sulphonated, the sulphonated bodies usually termed acid sludge. The major proportion of this sludge will separate on standing, but leaves behind finely suspended sludge, usually termed peppery sludge, which is extremely difficult to separate by ordinary methods.

The presence of water in oil before an acid treatment renders the added acid less effective in proportion to the water dilution, or decrease in strength of the sulfuric acid, thereby requiring the use of larger amounts of sulfuric acid to effect a desired purification. It is well known that by removing all the water from an oil before treating with fuming sulfuric acid, or 66° Bé. sulfuric acid the quantity of acid required to complete a certain purification is decreased.

We have also found that unless the peppery sludge aforementioned be removed from the oil, the subsequent treatment with an alkali hydrolyzes this peppery sludge, reverting the bodies originally removed, and thus deleteriously affecting the desirable properties of the oil. Another effect of this peppery sludge is that it consumes considerable alkali, or clay, as the case may be. It is therefore an object of our invention to devise a process of separating this peppery sludge from the acid treated oil before treatment with a neutralizing medium.

We have found that the filtering of an oil after an acid treatment through a solid material containing capillary passages causes a separation of suspended sludge. It is known that the filtering of an oil containing water through a matted filter of felt, sand, charcoal, etc., causes a separation of the two phases of the liquid into two layers, which can be separated by ordinary decanting methods. We find, however, that filters of this character have the disadvantage of permitting channeling of the liquid therethrough. By employing a solid material containing the capillary passages such channeling is prevented and the efficiency of the process increased.

We may use 200 mesh screens built up to a considerable thickness, i. e. approximately 1″, so as to provide considerable length of capillary passages, blocks of capillary tubes held together, such as glass tubes of fine bore held in a matrix or by any mechanical means, or porous blocks containing capillary passages, such as natural pumice rock cut into slabs, or a "Filtros" plate which is made by fusing particles of silica together at the points of contact of the particles to provide a solid plate containing capillary passages. Such a product is described in Patents 1,117,601 and 1,118,441.

The process of separation we believe is due to the selective adsorption of oil and sludge, in the capillary passages. As the oil containing the dispersed phase is passed through the pores of the filter, the sludge is retarded while the oil passes forward. The retarded phase is built up as globules cling together and agglomerate. When a sufficiently large globule is formed the globule moves forward out of the pore. On reaching the face of the plate this globule will roll down the plate, due to the higher specific gravity of the globule than the surrounding oil phase. By placing the plates vertically the agglomerated phase will gravitate downward, an immediate separation results and a maximum efficiency is obtained. This is the preferred arrangement. A horizontal arrangement of the plates causes the agglomerated phase to be carried on with the main stream and re-emulsification to occur. However, by insuring an immediate separation of the agglomerated phase, such as withdrawing the same to a separating chamber before passage to the next plate, this re-emulsification may be avoided.

The process will be better understood by reference to the accompanying drawing, in which Figure 1 shows a schematic arrangement of an apparatus for carrying out this process. Figure 2 is an end view of the filter, of which Figure 3 is a section along 3—3 of Figure 2.

In this drawing 1 is a tank for the oil to be treated, which may be lubricating oil or gasoline, as the case may be. 2 is a line connecting the tank with pump 3. 4 is a line connecting pump 3 with inlet 44 of the filter. The oil passes through 44 into chamber 5 of the filter. In passing through 5 some water may be deposited and is withdrawn through 9 and 9' into manifold 10 and collected via 11 in tank 12. The oil under the pressure of the pump passes through "Filtros" filter plate 7. Part of the water is separated by this "Filtros" filter plate and the separated water gravitates down the face of the plate 7, and is prevented from moving on by the baffle 8. The collected water is withdrawn through 9. The oil then passes through the other plates 7 and has its water separated in the successive passages therethrough, water being removed as previously through 9. Having passed through the last filter plate of the filter the oil passes down the enlarged chamber 5' where any water which settles out may be withdrawn through 9, and passes out substantially dehydrated through connection 41.

The oil then passes through line 13 into mixer 14 where it meets a stream of acid pumped from tank 15 through line 16, valve 16', by means of pump 17. The acid treated oil and the acid are passed into separator 19. In separator 19 the oil is allowed to settle and the acid sludge withdrawn through 20, controlled by valve 20'. The oil which has been practically freed of acid sludge passes through line 21', still under pressure, through an analogous filter as that previously described, where the remaining peppery sludge is removed by filtration through "Filtros" plates 21. The filter plates 21 have capillary passages of smaller diameter than those of plates 7, since the separation of the suspended peppery sludge requires a finer plate. The separated sludge which collects in front of the baffle 8 is withdrawn through lines 22 and 23, and is passed through 24, as is the sludge from 19. The oil, substantially free of sludge, is then passed into mixer 29 where it receives an alkali wash pumped from tank 26 by pump 28 through line 27, controlled by valve 27'. The alkali treated oil is then passed through line 30 into separator 31, and then from 31 into 34. It may be given a water wash if this is desired. In 31 and 34 the alkali is separated and withdrawn through line 32 controlled by valve 32', and line 36 controlled by valve 36'.

The oil, free from alkali, may contain some emulsified or suspended water. If it is to be given a clay treatment it may be passed into line 35, bypass line 42 controlled by valve 42', or it may be passed through a filter so as to dehydrate it in the same way as the oil was originally dehydrated. This filter contains plate 7 of the same fineness as that originally employed in the first filter. The brightened oil is passed through 41 into storage.

The filter is composed, as previously stated, of section 5, containing inlet 44 and outlet 9, having a flange 43. Section 6, of which there may be any desired number, contains a baffle plate 8, outlet 9 and flanges 43. The "Filtros" plate, which has a lead gasket 46, is placed between the flange 43 and held in place by bolts 45. 47 is held to the end of the section 5' by means of bolts 48.

As a specific example of the process the following may be given. The gasoline is passed through three "Filtros" plates to dehydrate the gasoline.

Gasoline is acid treated with either fuming acid or strong acid, for instance, between 63 and 66° Bé. sulphuric acid, and the acid sludge removed by settling in the usual manner. About 90% of the acid sludge is so removed. The gasoline, containing about 10% of the acid sludge in the form of a finely divided suspension, is passed through six "Filtros" plates. The sludge is drawn off from each compartment. We have found that about 90% of the contained sludge is removed by each plate. The sludge-free gasoline is then given an alkali wash and the separated gasoline passed to a three plate filter, and the gasoline when removed is brilliant. The use of 1% caustic of 25° Bé., followed by filtration, gives a doctor sweet gasoline of +30 color.

The rate of through put of the oil is such that the velocity of the oil be insufficient to re-emulsify the separated sludge or water. If the velocity is too great a turbulence is set up which agitates the separated phase, so causing re-emulsification.

We have also found that it is desirable to moisten the plates before circulating the oil to dehydrate it. Apparently the dehydration starts sooner if this is done. However, the same may be accomplished by circulating the oil through the plates for a period of time. The water in the oil is separated out and wets the plates. There will be no appreciable separation apparently until the plates are wetted.

The above is not to be taken as limiting our invention, but merely as illustrative of the best manner of carrying out our invention, which we claim to be:

1. A process of separating acid reaction products from an oil which has been treated with sulfuric acid, comprising, passing an acid treated oil containing sulfo-acids in the form of peppery sludge, through a series of foraminous blocks containing capillary passages, to agglomerate the sulfo-acids contained in said oil, causing said agglomerated sulfo-acids to separate from the oil in stages, and removing the separated sulfo-acids from the oil continually as separated.

2. A process of separating sulfuric acid reaction products from an oil which has been treated with sulfuric acid comprising, passing an oil containing acid sludge in the form of peppery sludge in stages through a series of solid blocks containing capillary passages; agglomerating, separating and removing a portion of the acid-sludge content from the oil; agglomerating, separating and removing a second portion of the acid-sludge content from the oil; continuing said agglomeration, separation and removal of the acid-sludge content from the oil until the said oil is substantially free of sulfuric acid reaction products.

3. A process of separating sulfuric acid reaction products from an oil which has been treated with sulfuric acid comprising, passing acid treated oil containing acid reaction products in the form of peppery sludge, through a series of solid foraminous blocks, containing capillary passages, to agglomerate the sulfuric acid reaction products contained therein, and continually collecting and removing the agglomerated acid reaction products in stages.

4. A process of separating sulfuric acid reaction products from an oil which has been treated with sulfuric acid, comprising passing a sulfuric acid treated oil containing suspended acid-sludge containing sulfo-compounds through a series of solid foraminous blocks containing capillary passages to gradually agglomerate the acid-sludge contained therein and continually collecting and removing the agglomerated acid-sludge in stages.

5. A process of separating sulfuric acid reaction products from an oil which has been treated with sulfuric acid, comprising passing an oil which had been treated with sulfuric acid and contains suspended acid-sludge containing sulfo-compounds reaction products, in stages through a series of solid blocks containing capillary passages; agglomerating, separating and removing a portion of the acid reaction products from the oil; agglomerating, separating and removing a second portion of the acid reaction products from the oil; continuing said agglomeration, separation and removal of the suspended acid reaction products from the oil until said oil is substantially free of the said suspended acid reaction products.

6. A process of separating sulfuric acid and acid reaction products from an oil which has been treated with fuming sulfuric acid, comprising passing an oil containing acid sludge containing sulfo-compounds and sulfuric acid in stages through a series of solid blocks containing capillary passages; agglomerating, separating and removing a portion of the acid-sludge and sulfuric acid content from the oil, repeating said agglomeration, separation and removal of the acid-sludge and sulfuric acid content from the oil, in stages until said oil is substantially free of acid-sludge and sulfuric acid.

7. A process of separating sulfuric acid reaction products from a dehydrated oil which has been treated with sulfuric acid comprising, passing said acid treated oil containing sulfo-compounds through a series of solid blocks containing capillary passages; agglomerating, separating and removing a portion of the sulfuric acid reaction products from the oil; repeating said agglomeration, separation and removal of the sulfuric acid reaction products from the oil in stages until said oil is substantially free of sulfuric acid reaction products.

In testimony whereof we affix our signatures.

EARLE W. GARD.
BLAIR G. ALDRIDGE.
HUGH J. MULTER.